United States Patent
Sherriff et al.

(10) Patent No.: US 7,369,912 B2
(45) Date of Patent: May 6, 2008

(54) BATCH EXECUTION ENGINE WITH INDEPENDENT BATCH EXECUTION PROCESSES

(75) Inventors: Godfrey R. Sherriff, Austin, TX (US); William G. Irwin, Austin, TX (US); David L. Deitz, Austin, TX (US); Grant Wilson, Austin, TX (US); Nathan W. Pettus, Georgetown, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 191 days.

(21) Appl. No.: 10/447,797

(22) Filed: May 29, 2003

(65) Prior Publication Data

US 2004/0254658 A1 Dec. 16, 2004

(51) Int. Cl.
*G06F 19/00* (2006.01)
*G06F 9/46* (2006.01)

(52) U.S. Cl. .................. 700/100; 700/99; 718/102
(58) Field of Classification Search .............. 700/7, 700/9, 11, 12, 17–21, 29, 80, 83, 86, 87, 99, 700/100, 23, 24; 718/100–102
See application file for complete search history.

(56) References Cited

U.S. PATENT DOCUMENTS

| | | | | |
|---|---|---|---|---|
| 4,910,691 A | * | 3/1990 | Skeirik | 706/45 |
| 5,280,626 A | * | 1/1994 | Kondo et al. | 703/28 |
| 5,282,139 A | * | 1/1994 | Kobayashi | 700/101 |
| 5,450,346 A | | 9/1995 | Krummen et al. | |
| 6,085,217 A | * | 7/2000 | Ault et al. | 718/105 |
| 6,148,244 A | * | 11/2000 | Tucker et al. | 700/100 |
| 6,289,252 B1 | * | 9/2001 | Wilson et al. | 700/7 |
| 6,385,496 B1 | * | 5/2002 | Irwin et al. | 700/87 |
| 6,449,624 B1 | * | 9/2002 | Hammack et al. | 707/203 |
| 6,522,934 B1 | | 2/2003 | Irwin et al. | |
| 6,629,003 B1 | * | 9/2003 | Frizzell et al. | 700/97 |

(Continued)

FOREIGN PATENT DOCUMENTS

GB 2 369 199 5/2002

OTHER PUBLICATIONS www.Google.com.*

(Continued)

*Primary Examiner*—David Vincent
*Assistant Examiner*—Jennifer L Norton
(74) *Attorney, Agent, or Firm*—Marshall, Gerstein & Borun LLP

(57) ABSTRACT

A process plant control system includes a batch execution engine that spawns or creates an individual batch process application in a separate application process space for each batch to be run within a process plant. The batch execution engine includes communication software for communicating with batch operator interfaces used to set up batch runs, a master process equipment model reflecting the current state of the equipment and a batch execution manager that creates individual batch processes and spawns each of the individual batch processes to run in a separate application process space. Each of the created batch processes includes batch logic that implements the batch run specified by the user, a copy of the process plant equipment model used to select equipment within the plant and a communication interface for communicating with controllers and other runtime equipment to implement the batch as well as for communicating with the batch execution manager.

31 Claims, 4 Drawing Sheets

U.S. PATENT DOCUMENTS

| | | | | |
|---|---|---|---|---|
| 7,127,304 | B1* | 10/2006 | Gould et al. | 700/20 |
| 7,221,922 | B2* | 5/2007 | Kemmochi et al. | 455/277.1 |
| 2003/0045950 | A1* | 3/2003 | Bronikowski et al. | 700/83 |
| 2004/0262290 | A1* | 12/2004 | Haanstra et al. | 219/490 |
| 2005/0143851 | A1* | 6/2005 | Scalfani et al. | 700/108 |
| 2005/0222698 | A1* | 10/2005 | Eryurek et al. | 700/90 |
| 2005/0256599 | A1* | 11/2005 | Peng | 700/100 |
| 2007/0101331 | A1* | 5/2007 | Krebs | 718/101 |
| 2007/0174839 | A1* | 7/2007 | Takahashi et al. | 718/100 |

OTHER PUBLICATIONS

Java Developer's Guide; Jaworski, Jamie, Sams.net Publishing, (1996).*

"Computer System Architecture"; Mano, Morris M., Prentice-Hall Inc., Second Edition, (1982), Chapter 7-9: Parallel Processing, pp. 273-284.*

"Operating Systems: Internals and Design Principles"; Stallings, William, Prentice-Hall Inc., Third Edition, (1998), Chapter 2.3: Major Achievements, pp. 60-71.*

U.S. Appl. No. 09/609,091 entitled "Campaign Management for Batch Processes," which was filed Jun. 30, 2000.

Search Report under Section 17(5) issued in GB0411362.7 application by United Kingdom Patent Office on Oct. 6, 2004.

Ramamurthy, B., "Threads and Concurrency," http://www.cs.buffalo.edu/faculty/bina/cse421/spring02/threads (2002).

RogueWave Library documentation, http://www.roguewave.com/support.docs/hppdocs/thrug/3-2.html (2004).

Examination Report under Section 18(3) issued in GB0411362.7 application by the United Kingdom Patent Office on Aug. 31, 2005.

* cited by examiner

BATCH EXECUTION ENGINE WITH INDEPENDENT BATCH EXECUTION PROCESSES

FIELD OF TECHNOLOGY

The present invention relates generally to process control networks and, more particularly, to a batch execution engine that implements independent batch processes in a process plant.

DESCRIPTION OF THE RELATED ART

Process control networks, such as those used in chemical, petroleum or other processes, generally include a centralized process controller communicatively coupled to one or more field devices which may be, for example, valve positioners, switches, sensors (such as temperature, pressure and flow rate sensors), etc. These field devices may perform physical control functions within the process plant (such as opening or closing a valve), may take measurements within the process plant for use in controlling the operation of the process plant or may perform any other desired function within the process plant. Process controllers have historically been connected to field devices via one or more analog signal lines or buses which may carry, for example, 4-20 mA (milliamp) signals to and from the field devices. More recently, however, the process control industry has developed a number of standard, open, digital or combined digital and analog communication protocols such as the FOUNDATION™ FIELDBUS (hereinafter "Fieldbus"), HART®, PROFIBUS®, WORLDFIP®, Device-Net® and CAN protocols which can be used to implement communications between a controller and field devices. Generally speaking, the process controller receives signals indicative of measurements made by one or more field devices and/or other information pertaining to the field devices, uses this information to implement a typically complex control routine and generates control signals which are sent via the signal lines or buses to the field devices to thereby control the operation of the process plant.

Certain types of process control networks, such as those used in batch processes, typically include multiple sets of replicated equipment, each set being designed to have the same or similar equipment which performs essentially the same function within the process plants. Thus, for example, a cookie manufacturing plant may have multiple sets of mixing equipment, multiple sets of baking equipment, and multiple sets of packaging equipment, with some or all of the individual mixers being capable of operating in parallel and of being connected to operate in series with some or all of the baking equipment and the packaging equipment. In such a system, it is desirable to be able to use the same general control algorithm or routine to control the operation of any particular set of replicated equipment to thereby reduce the number of control routines that must be created and stored within the controller. However, these control algorithms must be written so that, when executed, they specify the equipment of a particular unit being used at the time. Typically, a batch control procedure performs a number of different steps or stages in sequence, finishing the first stage before beginning the second stage and so on. Thus, in the cookie manufacturing plant described above, the batch procedure runs a first sub-process or step to control the mixing equipment, then runs a second sub-process to run the baking equipment on the product made by the mixing equipment and then runs a third sub-process that controls the packaging equipment to package the product produced by the baking equipment, each step of which takes a finite amount of time.

In prior process control systems, it is known to provide a batch executive routine or application to enable a user to execute a number of different batch runs concurrently within the process plant using different equipment or even using some of the same equipment at different times. This batch executive application stores a process equipment model that contains a list of and interconnections between the different equipment within the plant that the batch executive application uses to select the actual equipment to be used by each step of the individual batches being performed at any given time throughout the operation of the batches. A method of dynamically selecting equipment during the operation of the different batch runs is described in U.S. Pat. No. 6,522,934 which is hereby expressly incorporated by reference herein. As will be understood, the batch executive application can, depending on the size of the plant, be used to execute many concurrent batch runs using the different pieces of equipment within the plant.

In some larger process plants, batch executive applications is used to coordinate the execution of anywhere from one to potentially several hundred batches at a time. Unfortunately, some batch executive applications are programmed in such a way that a software failure encountered during any one of the batch runs may cause the batch executive application to "crash" or halt, which will generally cause all of the batches that are currently running under the control of the batch executive application to stop or halt. A crash of the batch executive application may result in the halting the throughput of the process plant and the need for an operator to manually restart all of the batch runs again. Such restart activities may take an inordinate amount of time to perform while the executive restores each batch to its previous state before the time of the crash and re-synchronizes to the underlying control system. Needless to say, this activity creates a large amount of downtime in the process plant and a lot of additional work for the operator. A crash of the batch executive application may also result in one or more of the batches that are in process plant at the time of the crash being scrapped, which may result in significant financial loss in terms of both wasted materials and lost plant operational time.

Still further, it is difficult, if not impossible to modify the configuration of the process equipment model used by known batch executive applications while this application is operating or executing within the process plant because each of the different batches being run by the batch executive application refer to or use this equipment model to make decisions as to the equipment to be used. Thus, with known batch executive applications, it is necessary to shut the batch executive application down (either waiting until the batches currently being executed are finished or halting the operation of those batches), update the configuration of the process equipment model within the batch executive application and then restart the batch executive application with the new process equipment model. As will be understood, this activity has potentially adverse effects on all of the batches whose execution is currently being controlled by the batch executive application.

Additionally, most operating software, such as the Microsoft Windows operating software, limits the amount of physical and virtual memory that can be addressed or used by any particular (single) application. In one case, the operating software enables a memory limit of about 2 gigabytes before the application runs out of memory space and is halted by the operating system. This feature necessarily limits the number of batches, especially large or complex batches having complex recipes, that can be run or executed simultaneously by the batch executive application because each new batch being run increases the memory requirements of the batch executive application. Currently, a batch executive application that runs close to a hundred simultaneous batches starts to run up against this memory limitation. While this memory constraint is not usually a problem in most smaller scale process plants, this constraint forces batch executive applications in very large process plants to be limited in the number of concurrent batches which they can execute. Because of this constraint, batch process designers sometimes implement multiple different batch executive applications within the same process plant to be able to run or implement the desired number of simultaneously running batches. However, using such a work around means that the different batch executive routines (which run as separate applications) are not able to share or coordinate the usage of the process equipment in the most economical or optimal manner.

SUMMARY OF THE DISCLOSURE

A process control system for a process plant includes a batch execution engine that spawns or creates an individual batch execution process for each batch to be run within the process plant. The batch execution engine includes communication software for communicating with batch operator interfaces or other interfaces that are used to set up a batch run, a master process equipment model reflecting the current state of the equipment within the process plant, and a batch execution manager which creates individual batch processes and spawns these individual batch processes off to run in separate application process spaces. Each of the created batch processes includes batch logic that implements a particular batch, as defined by the batch recipe, which includes a procedure having one or more unit procedures, each unit procedure having one or more unit operations, each operation having one or more phases, a copy of the process equipment model, and a communication interface for communicating with the batch execution manager to provide specific batch information to users, to request or provide coordination with other batches within the process plant, etc.

Each of the batch processes, once created, runs in an independent application space from the batch execution engine to implement and oversee the operation of a particular batch. Because the created batch processes are executed in separate application process spaces from the batch execution engine and from each other, a software failure in one batch process will not cause the crashing of the batch execution engine or of any of the other batch processes, which reduces the effect of a software failure in a particular batch process. Likewise, the process equipment model associated with the batch execution manager can be changed without effecting the current operation of existing batch processes because each of the running batch processes includes a copy of the process equipment model as it existed when the batch process was created and the batch process can use this equipment model copy, to the extent the information therein is still accurate, at any time during the operation of the batch process even if the batch execution manager is not running. Still further, because each of the batch processes is executed as a separate application in a separate application space, each batch process is not affected by limits imposed by the operating system on individual processes.

DETAILED DESCRIPTION

Figure 1:
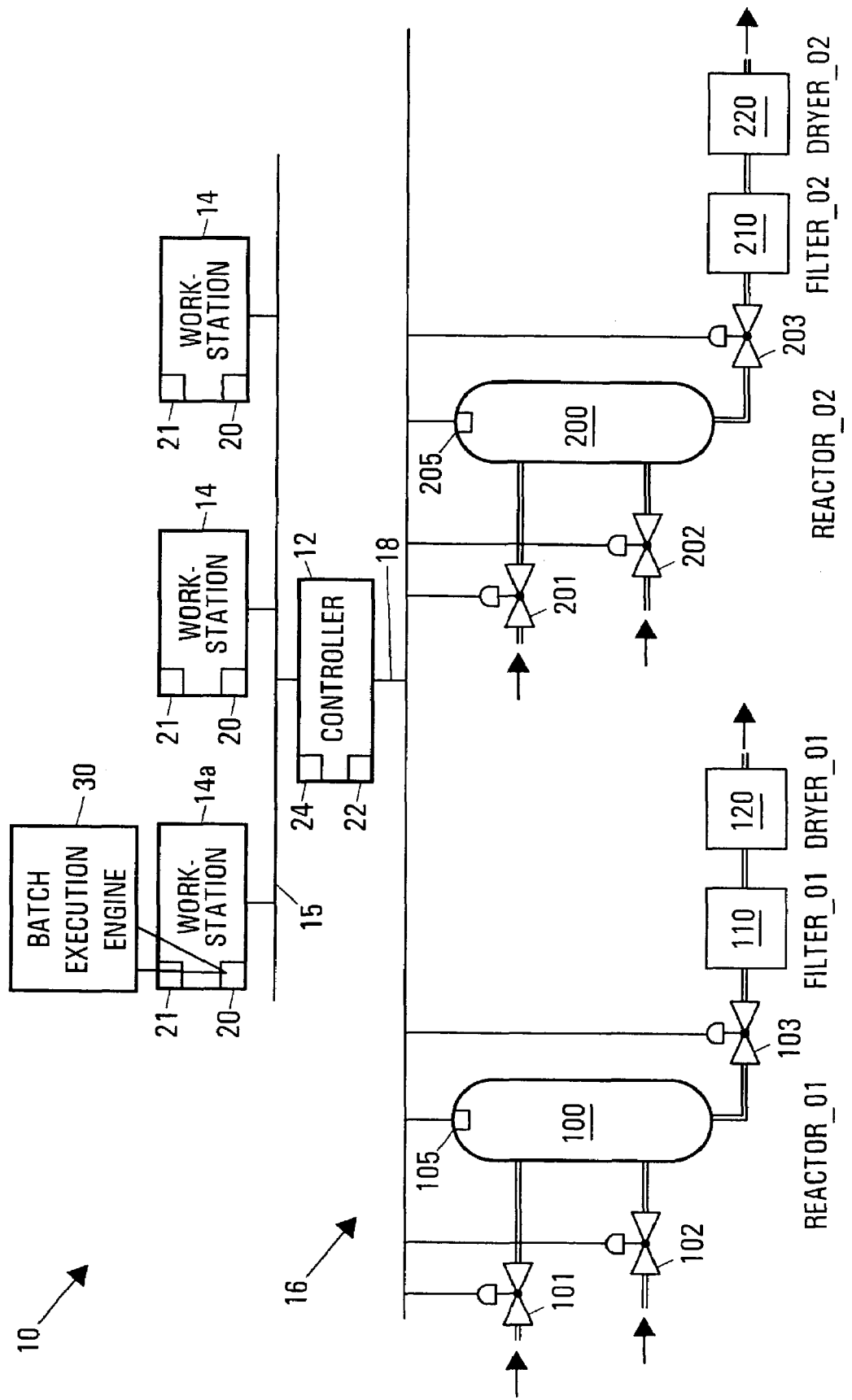
FIG. 1 is a partial block diagram, partial schematic diagram of a portion of a process control network on which a batch execution engine may implement simultaneous batch processes.

Referring now to FIG. 1, a process plant control network 10 includes a process controller 12 coupled to numerous workstations 14 via, for example, an Ethernet communications connection 15. The controller 12 is also coupled to devices or equipment within a process plant (generally designated by the reference numeral 16) via an input/output (I/O) device (not shown) and a set of communication lines or a bus 18. The controller 12, which may be by way of example only, the DeltaV™ controller sold by Fisher-Rosemount Systems, Inc., is capable of communicating with control elements, such as field devices and function blocks within field devices distributed throughout the process plant 16 to perform one or more process control routines to thereby implement desired control of the process plant 16. These process control routines may be continuous or batch process control routines or procedures. The workstations 14 (which may be, for example, personal computers, servers, etc.) may be used by one or more engineers or operators to design process control routines to be executed by the controller 12, to communicate with the controller 12 so as to download such process control routines, to receive and display information pertaining to the process plant 16 during operation of the process plant 16 and to otherwise interact with the process control routines executed by the controllers 12.

Each of the workstations 14 includes a memory 20 for storing applications, such as configuration design applications, and for storing data, such as configuration data pertaining to the configuration of the process plant 16. Each of the workstations 14 also includes a processor 21 that executes the applications to, among other things, enable a user to design process control routines and download those process control routines to the controller 12. Likewise, the controller 12 includes a memory 22 for storing configuration data and process control routines to be used to control the process plant 16 and includes a processor 24 that executes the process control routines to implement a process control strategy. If the controller 12 is a DeltaV controller, it, in conjunction with one or more applications on one of the workstations 14, may provide a graphical depiction of the process control routines within the controller 12 to a user illustrating the control elements within the process control routine and the manner in which these control elements are configured to provide control of the process plant 16.

In the example process plant control network 10 illustrated in FIG. 1, the controller 12 is communicatively connected via the bus 18 to two sets of similarly configured equipment, each set of equipment having a reactor unit referred to herein as Reactor_01 (R1) or Reactor_02 (R2), a filter unit referred to herein as Filter_01 (F1) or Filter_02 (F2) and a dryer unit referred to herein as Dryer_01 (D1) or Dryer_02 (D2). Reactor_01 includes a reactor vessel 100, two input valves 101 and 102 connected so as to control fluid inlet lines providing fluid from, for example, a headtank (not shown) into the reactor vessel 100 and an output valve 103 connected so as to control fluid flow out of the reactor vessel 100 via an outlet fluid line. A device 105, which can be a sensor, such as a temperature sensor, a pressure sensor, a fluid level meter etc. or some other equipment such as an electrical heater or a steam heater, is disposed in or near the reactor vessel 100. The Reactor_01 is coupled via the valve 103 to the Filter_01 having filter equipment 110 which, in turn is coupled to the Dryer_01 having dryer equipment 120. Similarly, the second set of equipment includes the Reactor_02 which has a reactor vessel 200, two input valves 201 and 202, an output valve 203 and a device 205. The Reactor_02 is coupled to the Filter_02 having filter equipment 210 which, in turn, is coupled to the Dryer_02 which has dryer equipment 220. The filter equipment 110 and 210 and the dryer equipment 120 and 220 may have additional control elements (such as heaters, conveyor belts and the like), sensors, etc. associated therewith. If desired, although not shown, each of the filter units Filter_01 and Filter_02 may be physically coupled to each of the reactor units Reactor_01 and Reactor_02 while each of the dryer units Dryer_01 and Dryer_02 may be coupled to each of the filter units Filter_01 and Filter_02 so that a batch run using one of each of a reactor, a filter and a dryer may use any combination of the equipment illustrated in FIG. 1.

As illustrated in FIG. 1, the controller 12 is communicatively coupled to the valves 101-103, 201-203, to the devices 105, 205, to the filters 110, 210 and to the dryers 120 and 220 (and to the other equipment associated therewith) via the bus 18 to control the operation of these elements (which may be units, field devices, etc.) to perform one or more operations with respect to these elements. Such operations may include, for example, filling the reactor vessels, or dryers, heating the material within the reactor vessels or dryers, dumping the reactor vessels or dryers, cleaning the reactor vessels or dryers, operating the filters, etc. Of course, the controller 12 could be coupled to the elements within the process plant 16 via additional busses, via dedicated communication lines, such as 4-20 ma lines, HART communication lines, etc.

The valves, sensors and other equipment illustrated in FIG. 1 may be any desired kind or type of equipment including, for example, Fieldbus field devices, standard 4-20 ma field devices, HART field devices, etc. and may communicate with the controller 12 using any known or desired communication protocol such as the Fieldbus protocol, the HART protocol, the 4-20 ma analog protocol, etc. Still further, other types of devices may be connected to and be controlled by the controller 12 in any desired manner. Also, other controllers may be connected to the controller 12 and to the workstations 14 via, for example, the Ethernet communication line 15 to control other devices or areas associated with the process plant 16 and the operation of such additional controllers may be coordinated with the operation of the controller 12 illustrated in FIG. 1 in any desired or known manner.

Generally speaking, the process control system of FIG. 1 may be used to implement batch processes in which, for example, one of the workstations 14 executes a batch execution system that implements and coordinates different batch runs within the process plant 16. Such a batch execution system 30 is illustrated as being stored in the workstation 14a of FIG. 1, it being understood that the batch execution system 30 could be stored in and executed in other workstations 14, or in other computers communicatively connected to the bus 15 or the bus 18 in any desired manner, including in any wireless manner. Likewise, as discussed in more detail with respect to FIG. 3, the batch execution system 30 may be divided into various components or be associated with various components stored in and executed in different computers or workstations within the process plant 16.

Generally speaking, the batch execution system 30 is a high level control routine that enables a user to specify a number of batch runs to be performed within the process plant and that sets up a number of different batch runs or batch processes to operate essentially independently within the process plant control network 10 to implement the different batch runs. Each such batch process directs the operation of one or more unit procedures, which are subroutines or processes that operate on a single unit, such as one of the reactor units, the filter units, the dryer units, or other equipment within the process plant. Each unit procedure (which is a part of a batch run that is generally run on one of the workstations 14) may perform a series of operations, each of which may perform one or more phases on a unit. For this discussion, a phase is the lowest level action or step performed on a unit and is typically implemented or executed in one of the controllers 12, an operation is a set of phases that performs a particular function on the unit and is typically implemented or executed on one of the workstations 14 by calling a series of phases within the controller 12, while a unit procedure is a series of one or more operations performed on a single unit and is typically implemented as a set of operation calls on one of the workstations 14. As a result, any unit procedure can include one or more phases and/or one or more operations. In this manner, each batch process performs different steps or stages (i.e., unit procedures) needed to produce a product, such as a food product, a drug, etc.

To implement different unit procedures, operations and phases for an individual batch, a batch process uses what is commonly referred to as a recipe which specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch, running a filter to filter the output of a reactor and then running a dryer to dry the product created in the reactor vessel. Each of the series of steps associated with a different unit defines a unit procedure of the batch and the batch process will execute a different control algorithm for each one of these unit procedures. Of course, the specific materials, amounts of materials, heating temperatures and times, etc. may be different for different recipes and, consequently, these parameters may change from batch run to batch run depending on the product being manufactured or produced and the recipe being used. Those skilled in the art will understand that, while control routines and configurations are described herein for batches using the reactor units, the filter units and the dryer units illustrated in FIG. 1, control routines may be used to control other desired devices to perform any other desired batch process runs or to perform continuous process plant runs, if so desired.

As will also be understood by those skilled in the art, the same phases, operations or unit procedures of a generic batch process can be implemented on each of the different reactor units of FIG. 1 at the same or at different times as part of different actual batch processes. Furthermore, because the reactor units of FIG. 1 generally include the same number of and types of equipment (i.e., they belong to the same unit class), the same generic phase control routine for a particular phase may be used to control each of the different reactor units, except that this generic phase control routine has to be modified to control the different hardware or equipment associated with the different reactor units. For example, to implement a fill phase for Reactor_01 (wherein the reactor unit is filled), a fill control routine will open one or more of the input valves 101 or 102 for a certain amount of time, for example, until the fluid level meter 105 senses that the vessel 100 is full. However, this same control routine may be used to implement a fill phase for Reactor_02 by merely changing the designation of the input valve(s) to be the valves 201 or 202 instead of the valves 101 or 102 and by changing the designation of the fluid level meter to be the fluid level meter 205 instead of the fluid level meter 105. Of course, the logic associated with the general operation of batch runs is known and will not be further described herein.

Figure 2:
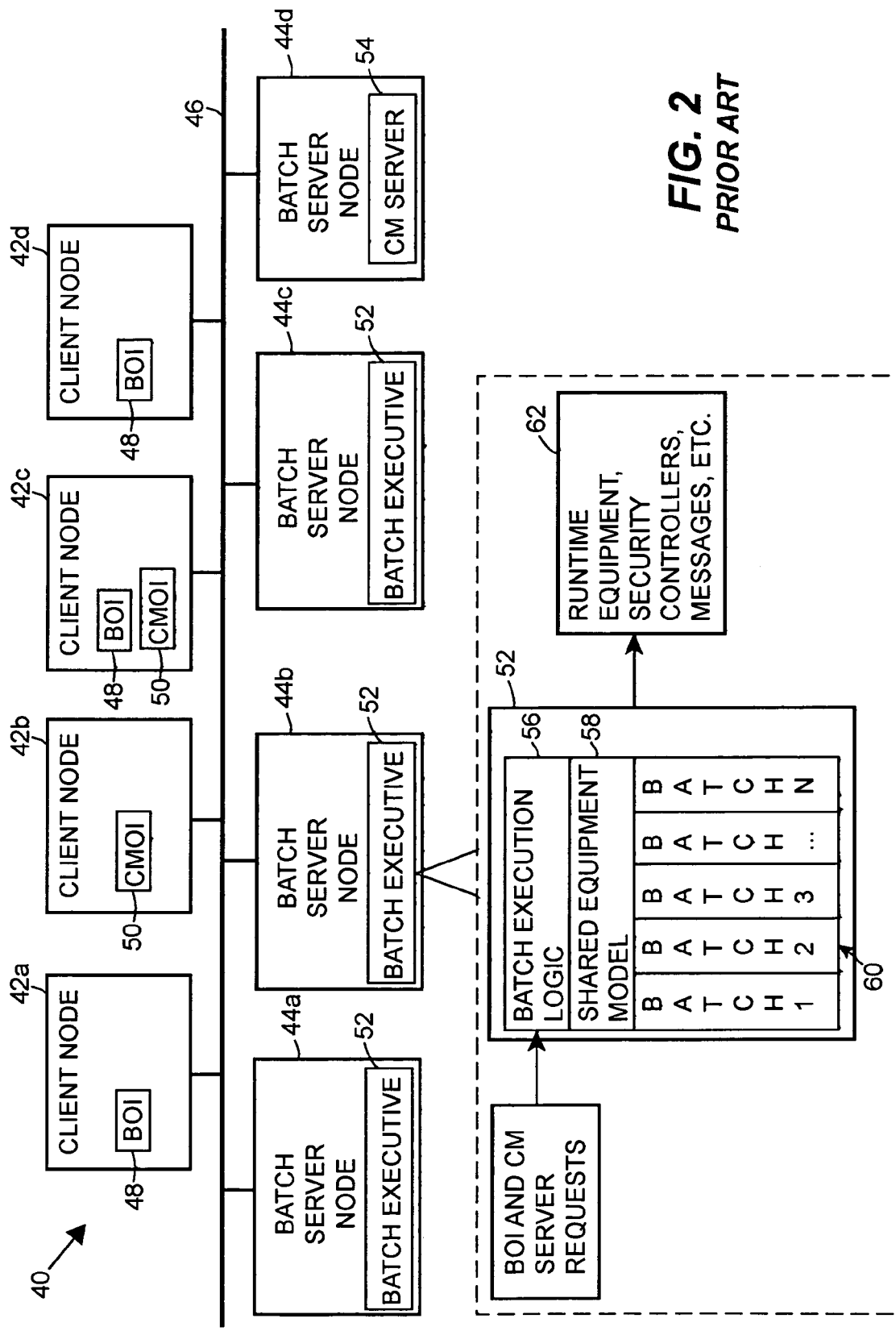
FIG. 2 is a block diagram of a network of computers including a prior art batch executive application used to implement multiple batches within a process plant without the use of separate batch processes.

FIG. 2 is a block diagram of a known client/server network 40 having a set of client computers or nodes 42 and a set of server computers or nodes 44 connected via a bus or other communication network 46 that has been used to enable and implement one or more prior art batch executive routines within a process plant. Generally, the batch network architecture of FIG. 2 takes the form of a classic two-tier, client/server based design in which the client nodes 42 provide commands or messages to the server nodes 44 which then execute actual batches within a process plant (not shown in FIG. 2). The client nodes 42 generally include operator interface applications which enable a user to set up and configure multiple batch runs within a process plant using any desired strategy applicable to the plant. In the diagram of FIG. 2, three of the client nodes 42a, 42c and 42d are illustrated as including a batch operator interface (BOI) application 48, which is a routine that interfaces with an operator to enable an operator to set up and specify an individual batch to be run, i.e., to initiate one or more batch runs. Similarly, the client nodes 42b and 42c are illustrated as including a campaign manager operator interface (CMOI) application 50 which enables a user to set up a campaign of batch runs (generally including multiple sequential batch runs) to be run or executed in a particular order or at particular times in the future within the process plant. One such campaign manager application is described in detail in U.S. patent application Ser. No. 09/609,091, entitled "Campaign Management for Batch Processes," which was filed on Jun. 30, 2000, the disclosure of which is hereby expressly incorporated by reference herein. It will be understood that other BOI and CMOI applications are known and may be used as well.

Each of the server nodes 44a, 44b, and 44c is a batch server having a known batch executive routine or application 52 which establishes bidirectional communication with one or more of the BOI applications 48 within the nodes 42a, 42c and 42d and which implements and oversees one or more separate batches within the process plant at the same time. In a similar manner, the client node 44d includes a campaign manager server application 54 which establishes bidirectional communication with the CMOI applications 50 and implements the batch campaigns created using the CMOI applications 50 by interfacing or communicating with the batch executive applications 52 (using batch initiation request) within the batch server nodes 44a, 44b and 44c. The client/server architecture of FIG. 2 is traditionally used to isolate the client applications from the server applications to provide greater fault tolerance.

As illustrated for the batch executive application 52 in the batch server node 44b, the batch executive application 52 responds to batch initiation requests sent by the campaign manager server 54 and the BOI applications 48 to implement one or more simultaneous batch runs within the process plant 16. It will be understood that the batch server 44b is communicatively connected to one or more controllers 12 which, in turn, are communicatively connected to one or more devices, units, etc. within the process plant as, for example, illustrated in FIG. 1.

With respect to the expanded diagram of the server node 44b of FIG. 2, the known batch executive routine 52 includes batch execution logic 56 and a process equipment model 58 used by the batch execution logic 56 to implement a finite number of different simultaneous batch runs 60 (labeled Batch 1, Batch 2, . . . , Batch N). In particular, the batch execution logic 56 creates or initiates a batch run 60 when commanded to by a user via one of the BOI applications 48 or by the campaign manager server 54 using the process equipment model 58 stored therein. As illustrated in FIG. 2, the batch execution logic 56 creates and runs the different batches 60 in the same application process space as the batch execution logic 56 and oversees the operation of these different batch runs 60 using a shared processing technique. Frequently, throughout the operation of a batch run 60, the batch executive logic 56 will access the process equipment model 58 to determine which equipment is available for use in the batch, etc. and will communicate with one or more controller runtime applications 62 to monitor the state of each batch run, to implement the different phases of the batch runs, to communicate with user interfaces or other applications within the client nodes 42 (or other workstations) to provide a user or operator information about the state of a batch run.

As noted above, a fault or failure of any of the batch runs 60, which may occur as a result of faulty equipment, lost communications with the controller or with individual pieces of equipment, memory or power failures, etc., may cause the batch execution logic 56 to fail or "crash" which will, consequently, result in the halting of the operation of each of the other batch runs 60 because all of the batch runs 60 are implemented by the batch execution logic 56 as part of the same application in the same application process space. As discussed above, this may result in significant down time and require significant operator involvement to bring each of the batch runs 60 back on line or may result in the loss of process plant materials and process plant operation time. Likewise, because of the memory limitations imposed by the operating software of the batch server 44b, the batch execution logic is practically limited in the number N of batch runs 60 that it can implement at one time (i.e., simultaneously). This limit may be a problem in large process plants which could potentially physically support hundreds of batch runs at any given time.

Figure 3:
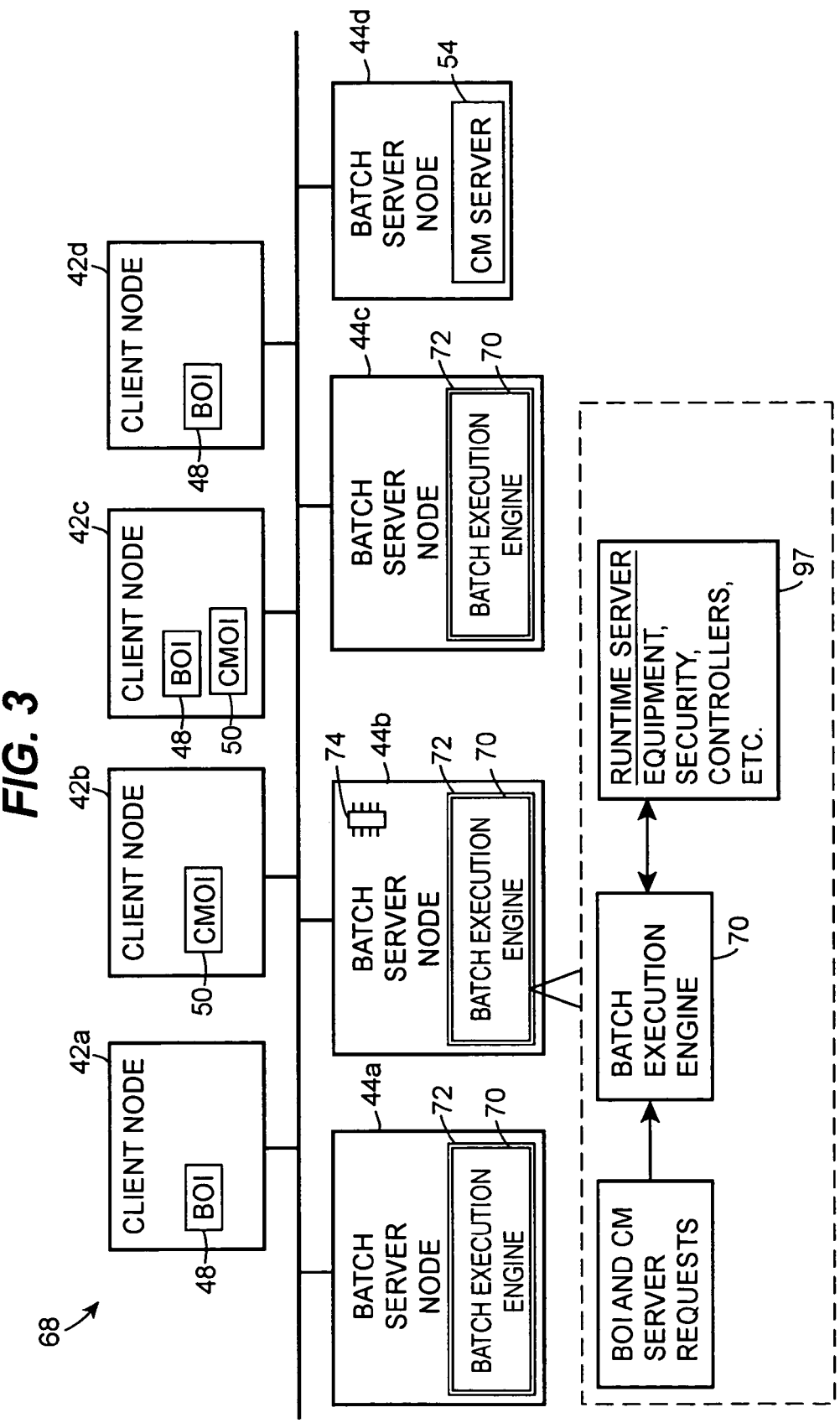
FIG. 3 is a block diagram of a network of computers including a batch execution engine having a batch execution manager that creates separate batch processes, each of which is used to implement a different batch within a process plant.

FIG. 3 illustrates a client/server network 68 similar to that of FIG. 2 (with like components having the same reference numbers), except that the batch servers 44 store and execute a batch execution engine 70 which is configured to eliminate some or all of the problems discussed above with respect to the prior art batch executive applications 52. As particularly illustrated for the batch server 44b in FIG. 3, each of the batch servers 44 includes a memory 72 which stores the batch execution engine 70 and a processor 74 which executes the batch execution engine 70 during operation of the process plant to create and run multiple different batch runs at the same time.

Figure 4:
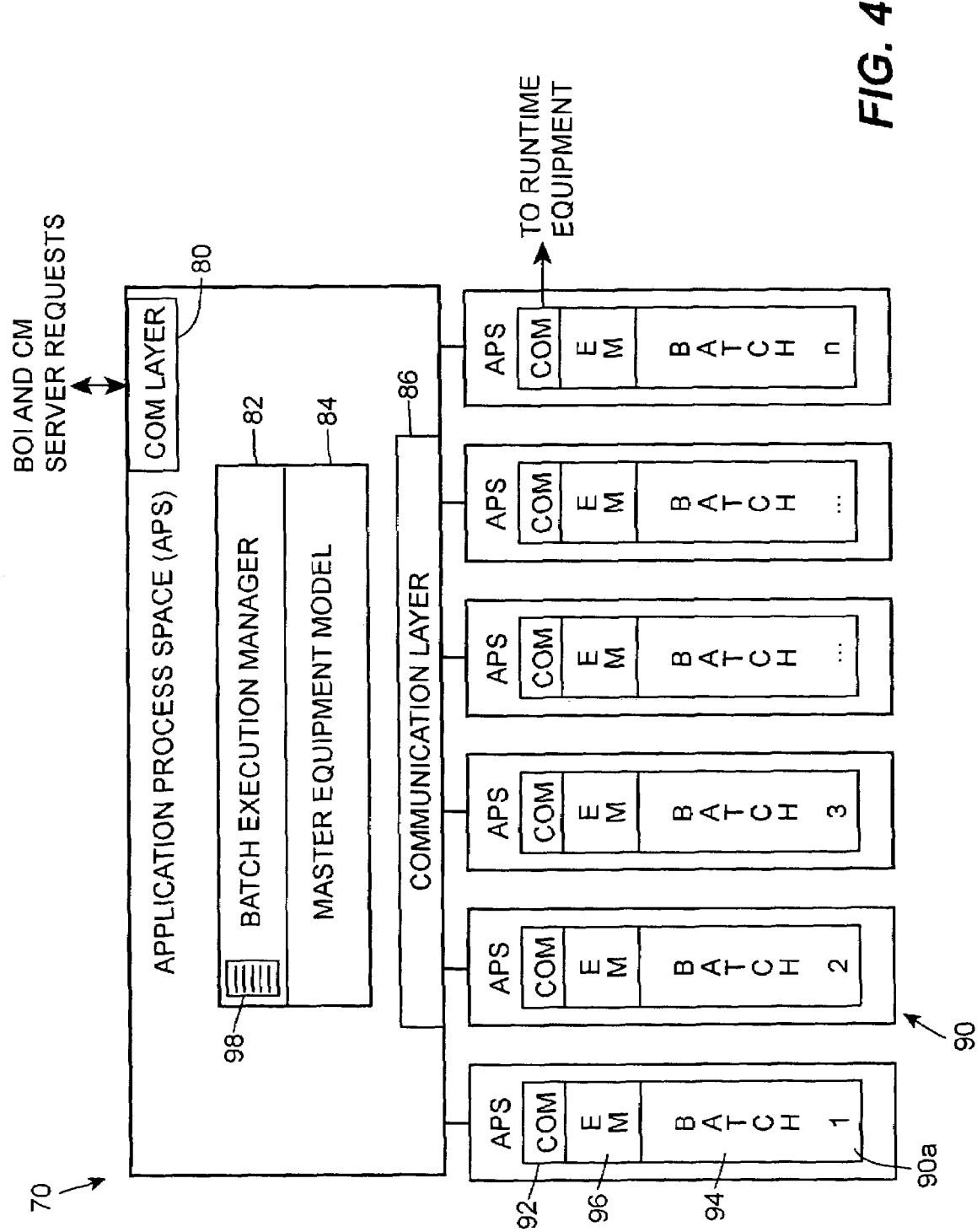
FIG. 4 is a block diagram of the batch execution engine of FIG. 3 that creates or spawns independent batch processes in different application process spaces to thereby implement simultaneous batches within a process plant.

Generally speaking, the batch execution engine 70, which is illustrated in more detail in FIG. 4, creates and spawns a separate batch process to be run in a separate application process space (APS) for each new batch to be coordinated. Each such batch process operates independently as a separate application to implement a particular batch, but may communicate with the batch execution engine 70 to coordinate the use of process equipment with other batches, to send status, alarm and other messages to an operator or other user, etc. In particular, as illustrated in FIG. 4, the batch execution engine 70 includes a first communication layer 80, a batch execution manager 82, a master equipment model 84 and a second communication layer 86. The first communication layer 80 may be any standard communication routine or program that enables communication with the BOI applications 48, the CM server 50 and/or any other desired applications, such as viewing and display applications within one of the client nodes 42 and enables users or operators to specify batches to be created and run within the process plant 16. The batch execution manager 82 is a program, routine or other logic that creates and spawns a different batch process 90 in a different application process space, i.e., as a separate program or application, for each different batch to run while the master equipment model 84 stores the most recent version of the equipment model for the plant to be used by the batches to, for example, select the equipment to be used in the different phases and operations of the batches. The second communication layer 86, which may be the same as the first communication layer 80, provides communications between the batch execution engine 70 and the different batch processes 90 currently running. Of course, the communication layer 86 may be implemented in any desired or known manner to provide communication between two different applications executing on the same processor.

FIG. 4 illustrates a set of N batch processes 90 (labeled Batch 1, Batch 2, . . . , Batch N) which are each in a different application process space (APS) and are, therefore, treated by the processor 74 of FIG. 3 as a separate program or application from the batch execution manager 82 and from each other. The batch execution manager 82 creates each of the batch processes 90 to include a communication layer 92, batch executive logic 94 and an equipment model 96. The communication layer 92 provides communication to the batch execution manager 82 of the batch execution engine 70 to enable the particular batch process 90 to receive messages from and to send messages to the batch execution manager 82 to, for example, provide status or alarm messages pertaining to the batch being implemented by the batch process 90, to request the batch execution manager 82 to resolve or arbitrate a process equipment issue or to otherwise enable the batch execution manager 82 to coordinate the different batch processes 90 with one another. The communication layer 92 also communicates with runtime equipment, such as controllers, field devices, etc. to implement, oversee and execute a batch run. Such communications may take place via a runtime server 97 (illustrated in FIG. 3) stored and executed in the same or a different server as the batch processes 90. Of course, the communication layer 92 may take on any desired form and will generally be dependent on the type of communications and communication networks used in the process plant 16 between the batch server nodes 44 and the client server nodes 42, as well as between the batch server nodes 44 and the runtime system (such as the controller 12 of FIG. 1).

The equipment model 96 is simply a copy of all of or a relevant portion of the master equipment model 84 as the master equipment model 84 existed when the batch process 90 was created and spawned by the batch execution manager 82. The batch executive logic 94 is the logic that actually implements a particular batch using particular equipment, that may be selected during operation of the batch from the equipment model 96, using a particular recipe as specified at the creation of the batch process 90. The batch executive logic 94 may be similar to the logic currently used in batch executive routines to initiate a batch, monitor the operation and progress of a batch, to specify the equipment, procedures, phases, etc. to be used during the batch as called for by a recipe, etc. As will be understood, the batch executive logic 94 is responsible for taking a single batch or batch run through all of its states, and for communicating with the batch execution manager 82 for equipment arbitration between the different batch processes 90 or for any other inter-batch process communications or client communications. Client communications may include sending batch status information, such as alarms, alerts, events, etc. generated during operation of the associated batch being implemented by the batch process 90. Of course, any desired batch execution logic may be used.

During operation, when a BOI application 48 or the campaign manager server 54 instructs the batch execution engine 70 to implement or create a batch, the batch execution manager 82 creates a batch process 90 (e.g., the batch process 90a) for that batch using the information about the batch as provided by the BOI application 48 or the campaign manager server 54. To create the batch process 90a, the batch execution manager 82 may store and use template batch process logic 98 including generic batch logic (or programming) and modify or instantiate this logic using a file or other data specifying the specific data to be used by the template batch logic to perform a particular batch, such as the recipe, the procedures, the equipment etc. to be used. During this time, the batch execution manager 82 may copy the master equipment model 84 (or any relevant portion thereof) into or as part of the batch process 90a. Once created, the batch execution manger 82 may then spawn the batch process 90a in any desired or known manner to cause the batch process 90a to execute in the processor 74 (FIG. 3) in a different application process space so that it operates as a stand alone application independently of the batch execution manager 82.

As illustrated in FIG. 4, the batch execution manager 82 creates a separate batch process 90 in a different application processing space for each new batch that is to be performed. Once created or spawned, each of the batch processes 90 is executed by the processor 74 of the batch server in which it is created and operates as any other application on that processor 74, thereby sharing memory space and processing time on the processor 74. As will be understood, each batch process 90 thereby runs on its own and may fail without necessarily effecting the batch execution manager 82 or any of the other batch processes 90. The batch execution engine 70 described herein thereby isolates the individual batch runs into separate batch processes executed on the same processor or in the same server but in separate application process spaces to thereby help prevent the failure of one of the batch runs from causing a failure or stoppage of all of the other batch runs being executed on the server. Thus, a failure (such as a software failure) in or with one of the batch processes 90 will not necessarily cause any of the other batch processes 90 to fail and, in most cases, may not even cause the batch execution engine 70 to fail. Thus, the failure will generally be isolated to a single batch run being implemented by a processor 74 and not carry over into or effect all of the batch runs being implemented by the processor 74. This fact significantly reduces the restart time associated with a batch software failure because, generally, only a single batch will need to be manually restarted. Also, in the event the batch cannot be restarted or must be scrapped, the batch failure isolation features described herein reduce the amount of lost process plant time and resources resulting from the failure.

Furthermore, because each of the batch processes 90 stores its own equipment model which it uses until it is finished, the master equipment model 84 within the batch execution engine 70 can be changed or altered at any time without effecting the operation of the batch runs or batch processes 90 currently running. Thus, a user or an operator can change the master equipment model 84 within the batch execution engine 70 to reflect changing conditions within the plant, such as the adding or removing of certain equipment, without having to wait for all of the currently running batch processes 90 to complete and without having to stop or halt the processes 90 to make the change in the batch execution engine 70.

Additionally, because each batch process 90 runs within a different application processing space than the batch execution engine 70, the batch execution engine 70 can implement many more batch runs simultaneously without violating the memory space allotment enforced by the operating software used on the batch server 44 (FIG. 3) because the addition or creation of each new batch process 90 does not significantly increase the memory used by the batch execution engine 82 once that batch process 90 is spawned off and running on its own. As a result, the batch execution manager 82 can effectively create any number of batch processes 90 to run simultaneously without violating the memory constraints imposed by the operating software for any single application.

Still further as described above, each batch server 44 of FIG. 3 may include a runtime server 97 which provides runtime interfacing and download services for all of the batch processes or applications 90 and may provide information like security information, equipment hierarchy information, recipe information and other controller or process plant information needed to create and run batches within the process plant 16. Likewise, the runtime server 97 may provide a communication interface between the batch processes 90 and the controllers 12 of FIG. 1 to enable the batch processes 90 to communicate with the controllers 12 and thereby initiate, monitor and control batches within the process plant 16. If desired, the runtime server 97 may enable partial downloads of equipment model changes to the master process equipment model 84 within the batch execution engine 70 and may be used to enable coordination between the different batch executive nodes 44 to thereby enable batch processes 90 executing within different one of the nodes 44 to coordinate with one another to effect, for example, inter-node equipment arbitration.

As will be understood, the batch execution engine architecture described herein may support the simultaneous execution of anywhere from one to several hundred or more different batch processes at any given time while reducing or preventing a software failure in any of the currently running batch processes from effecting the execution of any of the other batch processes or even the execution of the batch execution manager. Additionally, this batch execution engine architecture may significantly reduce the time to restart in the event of a software failure because, typically, only a single batch run (the one that caused the software failure) will need to be manually restarted, instead of all of the batch runs. Also, this batch execution engine architecture allows the equipment model within the batch execution engine to be altered without stopping or halting the different batch runs currently being implemented. Because each batch process operates in its own application processing space, there is also no practical limit on the number of batches that can be simultaneously executed by a single batch execution engine due to the operating software imposing a limit on the amount of physical and virtual memory that can be addressed by a single application. As a result, there is no need or there is a reduced need to create separate batch application engines in the same or different servers to provided isolation and to increase the number of simultaneous batch runs that can be implemented at any given time in a process plant.

It will be understood that batch routines, such as batch execution engine, the BOI, CMOI and the campaign manager server applications described herein, can be used and implemented within any desired process plant control programming environment, and may be used in any process plant control system using any desired type of process plant control communication protocol and, further, may be used to perform any type of function with respect to any type of device(s) or sub-units of device(s). While the batch routines as described herein are preferably implemented in software stored in, for example, a server, a workstation or other computer, these routines may alternatively or additionally be implemented in hardware, firmware, application specific integrated circuits, programmable logic circuits, etc., as desired. If implemented in software, the batch routines may be stored in any computer readable memory such as on a magnetic disk, a laser disk, or other storage medium, in a RAM or ROM of a computer, controller, field device, etc. Likewise, this software may be delivered to a user or a device via any known or desired delivery method including, for example, over a communication channel such as a telephone line, the Internet, on a transportable medium, such as a computer-readable disk, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A batch execution engine executed on a processor in a process plant to implement a plurality of batch runs on process equipment within the process plant, the batch execution engine comprising:

a memory;

a communication layer stored on the memory which executes on the processor in a first application process space to receive a plurality of batch initiation requests, wherein each batch initiation request relates to a different batch run having a plurality of batch sub-procedures to be implemented on some portion of the process equipment; and a batch execution manager stored on the memory which executes on the processor in the first application process space to create a different batch process application in response to the receipt of each of the plurality of batch initiation requests, wherein each of the created batch process applications is created to include an associated equipment model that specifies an identification of and interconnectivity of process equipment within the process plant to be used during a particular batch run, the equipment model being a copy of at least a portion of an equipment model for the plant, a separate executable logic code that implements the particular batch run using the associated equipment model and a communication layer that communicates with the batch execution manager while the batch process application is executing, so that each of the created batch process applications executes executable logic code on the processor in a separate application process space different than the first application process space to implement one of the plurality of batch runs using the process equipment identified by one of the associated equipment models to thereby run independently of the batch execution manager on the processor.

2. The batch execution engine of claim 1, further including a master process equipment model specifying process equipment within the process plant and wherein the batch execution manager provides each of the batch process applications with a copy of at least a portion of the master process equipment model as the associated equipment model for that batch process application when creating each of the batch process applications.

3. The batch execution engine of claim 1, wherein the batch execution manager creates each of the batch process applications to include batch executive logic as the separate executable logic code which interfaces with the process equipment to implement and control one of the plurality of batch runs within the process.

4. The batch execution engine of claim 3, wherein the batch execution manager includes a batch logic template which the batch execution manager uses to create the batch executive logic for each of the batch process applications.

5. The batch execution engine of claim 3, further including a master process equipment model specifying process equipment within the process plant and wherein the batch execution manager provides each of the batch process applications with a copy of at least a portion of the master process equipment model as the associated equipment model for that batch process application when creating each of the batch process applications.

6. The batch execution engine of claim 1, wherein the communication layer includes a communication component which communicates with each of the batch process applications in the separate application process spaces.

7. The batch execution engine of claim 6, wherein the batch execution manager provides coordination between two or more of the batch process applications when the two or more of the batch process applications are executing on the processor.

8. A process control system for use in controlling a plurality of batch runs within a process having a set of process equipment, the process control system comprising:

one or more process controllers for controlling the set of process equipment;

a server including a processor and a memory;

a communication layer stored on the memory of the server which executes on the processor in a first application process space to receive a plurality of batch initiation requests; and a batch execution manager stored on the memory which executes on the processor in the first application process space to create a different batch process application in response to the receipt of each of the plurality of batch initiation requests, wherein each of the created batch process applications includes an associated equipment model that specifies an identification of and interconnectivity of process equipment within the process plant to be used during a particular batch run, the equipment model being a copy of at least a portion of an equipment model for the plant, a separate executable logic code that implements the particular batch run using the associated equipment model and a communication layer that communicates with the batch execution manager while the batch process application is executing, so that each of the created batch process applications executes the executable logic code on the processor in a separate application process space different than the first application process space to communicate with the one or more process controllers to implement a batch run using the process equipment identified by one of the associated equipment models.

9. The process control system of claim 8, further including an operator interface having a batch operation interface application stored thereon, wherein the batch operation interface application executes on a processor to create and send the plurality of batch initiation requests to the communication layer.

10. The process control system of claim 8, further including a runtime server application which communicates with the one or more process controllers and with the batch process applications to implement the batch runs via the process controllers in response to signals from the batch process applications.

11. The process control system of claim 8, further including a second server including a second processor and a second memory, a second communication layer stored on the second memory of the second server which executes on the second processor in a further application process space to receive a plurality of additional batch initiation requests and a second batch execution manager stored on the second memory which executes on the second processor in the further application process space to create a different batch process application in response to the receipt of each of the plurality of additional batch initiation requests, wherein each of the created different batch process applications includes a different associated equipment model that specifies an identification of and interconnectivity of process equipment within the process plant to be used during a particular additional batch run, a separate executable logic code that implements the particular additional batch run using the different associated equipment model and a further communication layer so that each of the created different batch process applications executes on the second processor in a separate application process space different than the further application process space to communicate with the one or more process controllers to implement a batch run using the process equipment.

12. The process control system of claim 8, further including a master process equipment model specifying process equipment within the process plant and wherein the batch execution manager provides each of the batch process applications with a copy of at least a portion of the master process equipment model as the associated equipment model when creating each of the batch process applications.

13. The process control system of claim 8, wherein the batch execution manager creates each of the batch process applications to include as the separate executable logic code, batch executive logic which interfaces with the one or more process controllers to implement and control a batch run within the process.

14. The process control system of claim 13, wherein the batch execution manager includes a batch logic template which the batch execution manager uses to create the batch executive logic for each of the batch process applications.

15. The process control system of claim 13, further including a master process equipment model specifying process equipment within the process plant and wherein the batch execution manager provides each of the batch process applications with a copy of at least a portion of the master process equipment model as the associated equipment model when creating each of the batch process applications.

16. The process control system of claim 8, wherein the communication layer includes a communication component that communicates with each of the batch process applications in the separate application process spaces.

17. The process control system of claim 16, wherein the batch execution manager provides coordination between two or more of the batch process applications when the two or more of the batch process applications are executing on the processor.

18. A method of implementing multiple batches to run simultaneously within a process plant having one or more process controllers coupled to process equipment, the method comprising:
accepting batch initiation data from a user specifying a plurality of batches to be run within the process plant;
sending the batch initiation data to a batch server communicatively coupled within the process;
receiving the batch initiation data for each of the plurality of batches to be run within the process at a first application executed in a first application process space on the batch server and creating, for each set of batch initiation data, a batch process application to include an associated equipment model that specifies an identification of and interconnectivity of process equipment within the process plant to be used during a particular batch run, the associated equipment model being a copy of at least a portion of an equipment model for the plant, a separate executable logic code that implements the particular batch run using the associated equipment model and a communication layer that communicates with a batch manager while the batch process application is executing, wherein the batch process application communicates with the one or more process controllers to implement a batch run using the process equipment according to the batch initiation data; and
running each of the batch process applications in the batch server in a different application process space than the first application process space to implement the batches to be run within the process.

19. The method of claim 18, wherein running the batch process applications in a different application process space further includes running each of the batch process applications in a different application process space from one another.

20. The method of claim 18, wherein accepting the batch initiation data includes using a batch operation interface application to accept the batch initiation data.

21. The method of claim 18, wherein sending the batch initiation data includes sending the batch initiation data from a first computer to a second computer via a communication network.

22. The method of claim 18, wherein running each of the batch process applications in a different application process space than the first application process space includes running each of the batch process applications in a different application process space at the same time.

23. The method of claim 18, including storing a master process equipment model within the batch server and wherein creating a batch process application includes copying a least a portion of the master process equipment model and using the copied portion of the master process equipment model as the associated equipment model of the batch process application.

24. The method of claim 18, further including providing communications between the batch process applications and the first application and having the first application coordinate the operation of the batch process applications with each other using the communications between the batch process applications and the first application.

25. The method of claim 18, further including providing communications between the batch process applications and the first application and having the batch process applications provide the first application with batch status data pertaining to the operation of the batches to be run within the process using the communications between the batch process applications and the first application.

26. The method of claim 25, wherein the batch status data is alarm data generated during operation of the batches to be run within the process.

27. The method of claim 23, further including changing the master equipment model while a previously created batch process application is executing without interrupting the previously created batch process application.

28. The method of claim 23, further including changing the master equipment model after a previously created batch process application has been created without changing the associated equipment model of the previously created batch process application and allowing the previously created batch process application to execute after the master equipment model is changed.

29. The batch execution engine of claim 1, wherein each of the created batch process applications executes on the processor in a separate application process space different than the first application process space so that a failure during execution of one of the created batch process applications does not halt the processor in a manner that prevents the batch execution manager from continuing to execute on the processor.

30. The batch execution engine of claim 1, wherein each of the created batch process applications executes on the processor in a separate application process space different than the first application process space so that a failure during the execution of one of the created batch process applications does not halt the processor in a manner that prevents the execution of the other ones of the batch process applications on the processor.

31. The batch execution engine of claim 1, further including an operating system run on the processor and wherein each of the created batch process applications executes on the processor in a separate application process space different than the first application process space so that the operating system enforces memory size limits with respect to each of the batch process applications separately instead of cumulatively.

* * * * *